US009955510B2

(12) United States Patent
Cho et al.

(10) Patent No.: US 9,955,510 B2
(45) Date of Patent: Apr. 24, 2018

(54) METHOD AND TERMINAL FOR DISTRIBUTED ACCESS

(71) Applicant: Electronics and Telecommunications Research Institute, Daejeon (KR)

(72) Inventors: Seungkwon Cho, Daejeon (KR); Seokki Kim, Daejeon (KR); Sung Kyung Kim, Daejeon (KR); Hyung Jin Kim, Daejeon (KR); Soojung Jung, Daejeon (KR); Sung Cheol Chang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 334 days.

(21) Appl. No.: 14/324,492

(22) Filed: Jul. 7, 2014

(65) Prior Publication Data

US 2015/0009917 A1 Jan. 8, 2015

(30) Foreign Application Priority Data

Jul. 8, 2013 (KR) ........................ 10-2013-0079923
Jul. 4, 2014 (KR) ........................ 10-2014-0083782

(51) Int. Cl.
*H04W 72/04* (2009.01)
*H04W 74/08* (2009.01)
*H04W 72/10* (2009.01)
*H04W 72/02* (2009.01)
*H04W 74/02* (2009.01)

(52) U.S. Cl.
CPC ....... *H04W 74/0875* (2013.01); *H04W 72/10* (2013.01); *H04W 72/02* (2013.01); *H04W 74/02* (2013.01)

(58) Field of Classification Search
CPC ............ H04W 74/0875; H04W 72/10; H04W 72/1247; H04W 72/0413; H04W 74/02
USPC ........................................................ 370/329
See application file for complete search history.

(56) References Cited

U.S. PATENT DOCUMENTS

2006/0165035 A1* 7/2006 Chandra ............... H04W 28/16
370/329
2007/0047478 A1* 3/2007 Balachandran ....... H04W 72/10
370/328

(Continued)

FOREIGN PATENT DOCUMENTS

KR 10-2013-0048709 A 5/2013

OTHER PUBLICATIONS

IBM et al. "The Method for preventing unauthorized network access by occupying idle IP addresses", Nov. 1, 2002, IP.com, Jun. 21, 2003, pages: all.*

(Continued)

*Primary Examiner* — Un C Cho
*Assistant Examiner* — Shah Rahman
(74) *Attorney, Agent, or Firm* — Rabin & Berdo, P.C.

(57) ABSTRACT

Disclosed are a method and a terminal for a distributed access. The terminal maps data channels to be allocated in a plurality of data channels included in a frame and map scheduling priorities. In this case, the terminal determines positions of resources of a first message as a resource request message and a second message as a response message for the first message in the first channel.

16 Claims, 10 Drawing Sheets (56) References Cited

U.S. PATENT DOCUMENTS

| | | | | |
|---|---|---|---|---|
| 2009/0003306 | A1* | 1/2009 | Plutov | H04W 72/10 370/348 |
| 2009/0093262 | A1* | 4/2009 | Gao | H04W 68/00 455/458 |
| 2009/0109850 | A1* | 4/2009 | Li | H04W 72/1242 370/235 |
| 2009/0252102 | A1* | 10/2009 | Seidel | H04W 84/18 370/329 |
| 2010/0009695 | A1* | 1/2010 | Kwon | H04W 16/06 455/452.2 |
| 2010/0131644 | A1* | 5/2010 | Jeong | H04W 40/24 709/224 |
| 2010/0226342 | A1* | 9/2010 | Coiling | H04W 56/002 370/336 |
| 2011/0206033 | A1* | 8/2011 | Ahn | H04W 74/0816 370/350 |
| 2011/0268065 | A1* | 11/2011 | Park | H04L 1/0003 370/329 |
| 2012/0039308 | A1* | 2/2012 | Kim | H04W 8/005 370/336 |
| 2012/0163278 | A1* | 6/2012 | Chang | H04L 12/189 370/312 |
| 2012/0281649 | A1* | 11/2012 | Zhou | H04W 72/02 370/329 |
| 2013/0114531 | A1* | 5/2013 | Ahn | H04W 72/04 370/329 |
| 2014/0056249 | A1* | 2/2014 | Park | H04W 24/10 370/329 |
| 2014/0362795 | A1* | 12/2014 | Choi | H04W 4/005 370/329 |
| 2015/0237623 | A1* | 8/2015 | Choi | H04W 72/0446 370/329 |
| 2016/0007335 | A1* | 1/2016 | Chun | H04W 8/005 370/336 |
| 2016/0037323 | A1* | 2/2016 | Kim | H04W 8/005 370/329 |
| 2016/0081073 | A1* | 3/2016 | Lindoff | H04W 72/1257 370/329 |

OTHER PUBLICATIONS

Seungkwon Cho et al., "A MAC proposal for PAC operating in synchronous mode" IEEE P802.15 Working Group for Wireless Personal Area Networks (WPANs), Jul. 15, 2013.

Seungkwon Cho et al., "Text proposal of both MAC and PHY for PAC operating in synchronous mode" IEEE P802.15 Working Group for Wireless Personal Area Networks (WPANs) Jul. 17, 2013.

* cited by examiner

METHOD AND TERMINAL FOR DISTRIBUTED ACCESS

CROSS-REFERENCE TO RELATED APPLICATION

This application claims priority to and the benefit of Korean Patent Application No. 10-2013-0079923 and 10-2014-0083782 filed in the Korean Intellectual Property Office on Jul. 8, 2013, and Jul. 4, 2014, respectively, the entire contents of which are incorporated herein by reference.

BACKGROUND OF THE INVENTION (a) Field of the Invention

The present invention relates to a method and a terminal for a distributed access in a wireless communication environment.

(b) Description of the Related Art

Recently, interests have increased in direct communications (Device to Device, D2D) for providing proximity-based application services, and various techniques supporting the direct communication has been proposed. Examples of a representative technique supporting the direct communications in a wireless distributed communication network include FlashLinQ, WiFi Direct, and IEEE 802.15.8 (peer awareness communication).

In the case of WiFi which comes into the spotlight among the above-mentioned techniques, when the number of terminals that have competition for radio resources is smaller than ten or more, users may not feel big problems in access latency, throughput of terminals, and the like. However, when the number of terminals that have competition for radio resources exceed ten or more, users may stop using WiFi due to quickly increased access latency and quickly dropped throughput of the terminals. This is because WiFi depends on CSMA/CA (carrier sense multiple access/collision avoidance). Particularly, in a heavy duty system, an access latency time is exponentially increased when the number of the terminals is increased over ten or more. This is because the overhead is quickly increased in the competition. To solve this problem, IEEE 802.11 HEW (high efficiency WLAN) and IEEE 802.15.8 PAC (peer aware communication, IEEE 802.15.8) has recently been being researched an accessing method for a large number of terminals.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a distributed access method and a distributed access terminal, having advantages of being capable of reducing performance degradation of terminals even when the number of the terminals is increased.

An exemplary embodiment of the present invention provides a method for allowing a first terminal to perform a distributed access in a first frame including a plurality of data channels. The method includes mapping a first data channel that is to be allocated to the first terminal among the data channels thereto; mapping a scheduling priority of the first terminal thereto; and determining positions of resources of a first message as a resource request message and a second message as a response message for the first message according to the scheduling priority in the first channel.

The mapping of the first data channel may include mapping the first data channel according to a distinct identifier of the first terminal, an index of a superframe to which the first frame pertains, and an index of the first frame.

The index "I" of the first data channel may be determined by the following equation:

$$I = \{\text{floor}(p/8) + s \cdot 10 + n\} \bmod 16$$

where "p" indicates the distinct identifier of the first terminal, "s" indicates the index of the superframe, and "n" indicates the index of the first frame.

The determining of the scheduling priority may include determining the scheduling priority according to the distinct identifier (p) of the first terminal, the index (s) of the superframe to which the first frame pertains, and the index (n) of the first frame.

The scheduling priority may be differently determined according to whether a first value of $(p+s \cdot 10+n)$ modulo 8 is zero.

When the first value is not zero, the scheduling priority of the first terminal may be determined by the following equation:

$$SP(s, n, p) = \sum_{k=1}^{(p+s \times 10+n) \bmod 8} (-1)^{k+1} \cdot (8-k).$$

When the first value is zero, the scheduling priority may be zero.

The first data channel may include a scheduling interval and a data interval.

The method may further include, when the first terminal attempts to transmit the first message, transmitting a first signal serving to indicate that the first frame is to be transmitted.

The method may further include transmitting the first message at the determined position of the resource of the first message; and transmitting a blocking signal at an interval for the first message other than the first message of the first terminal.

The first message may include a first information field indicating an amount of resources that are necessary for the first terminal, and a value of the first information field may be determined according to data burst that is necessary for data transmission of the first terminal, an ACK that are received from a second terminal peered to the first terminal, and a gap corresponding to a time difference between the data and the ACK.

The method may further include receiving the second message at the determined position of the resource of the second message from a second terminal that is peered to the first terminal.

The second terminal may calculate an offset by receiving the first message from terminals having scheduling priorities that are higher than the scheduling priority of the first terminal, and includes values of the offset and the first information field in the second message to transmit it to the first terminal.

The method may further include receiving the second message from third terminals having scheduling priorities that are higher than the scheduling priority of the first terminal after receiving the second message from the second terminal; and checking whether resources allocated to the third terminals and a resource allocated to the first terminal are overlapped to each other by using the second message received from the third terminals.

The method may further include determining whether remaining terminals other than the first terminal and a second terminal that is peered to the first terminal participate in competition for a second data channel as a data channel that follows up the first data channel; and performing consecutive allocation in the second data channel when the remaining terminals do not participate in the competition.

Another embodiment of the present invention provides method for scheduling a plurality of terminals that perform competition in a wireless communication environment. The method includes providing a first frame including a plurality of data channels; mapping data channels to the corresponding terminals among the data channels; mapping scheduling priorities of the terminals thereto; allowing a transmitting terminal among the terminals to transmit a scheduling request indicator (SRI) signal when the transmitting terminal attempts to transmit a distributed resource request message as a request message for a resource; allowing the transmitting terminal to transmit the distributed resource request message according to the scheduling priorities at a scheduling interval of the mapped data channels; and allowing a receiving terminal corresponding to the transmitting terminal to transmit a distributed resource response message in response to the distributed resource request message according to the scheduling priorities at the scheduling interval, wherein the mapping of the data channels and the mapping of the scheduling priorities are determined according to a terminal distinct identifier shared by the transmitting terminal and the receiving terminal, an index of a superframe to which the first frame pertains, and an index of the first frame.

The method may further include allowing the transmitting terminal to determine whether remaining transmitting terminals other than the transmitting terminal transmit the SRI signal in a data channel that follows up the mapped data channels; and, when it is determined that no SRI signal is transmitted, allowing the transmitting terminal to perform consecutive allocation in the followed-up data channel.

Yet another embodiment of the present invention provides a terminal. The terminal includes a wireless frequency converter; and a processor connected to the wireless frequency converter to map data channels to be allocated in a plurality of data channels included in a frame and map scheduling priorities for resources, wherein the processor performs the mapping of the data channels and the mapping of the scheduling priorities according to a terminal distinct identifier, an index of a superframe to which the first frame pertains, and an index of the first frame.

The processor may determine whether remaining terminals other than the terminal participate in competition in a data channel that follows up the mapped data channel and, when the remaining terminals do not participate in the competition, controls the terminal perform consecutive allocation.

The processor may differently map the scheduling priorities according to whether a value of (distinct identifier of the terminal+index of the superframe*10+index of the frame) modulo 8 is zero.

According to the exemplary embodiments of the present invention, although a large number of terminals share and use radio resources, it is possible to facilitate communications between many terminals with reduced performance degradation thereof

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification, a terminal may indicate a mobile terminal (MT), a mobile station (MS), an advanced mobile station (AMS), a high reliability mobile station (HR-MS), a subscriber station (SS), a portable subscriber station (PSS), an access terminal (AT), a user equipment (UE), a peer aware communication (PAC) device (PD), or the like, and may include all or some of the functions of the terminal, the MT, the AMS, the HR-MS, the SS, the PSS, the AT, the UE, the PD, or the like.

Exemplary embodiments are related to a method of transmitting all or some of data without collision with each other by acquiring radio resources shared by terminals having the same or similar functions through a distributing method. The exemplary embodiments of the present invention will be described in detail below.

Figure 1:
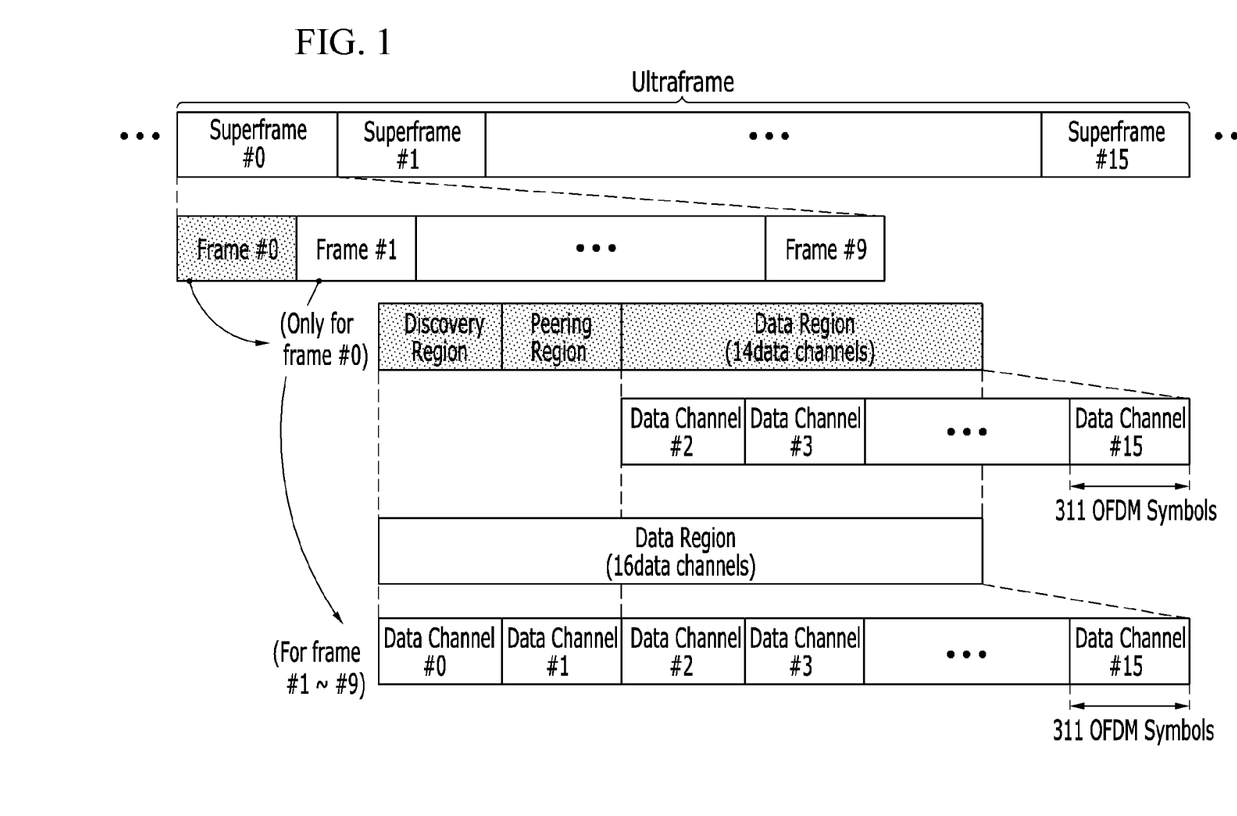
FIG. 1 shows a wireless resource structure according to an exemplary embodiment of the present invention.

FIG. 1 shows a wireless resource structure according to an exemplary embodiment of the present invention. In FIG. 1, it is obvious that the number and the length of superframes, frames, data regions, and data channels are merely an example, and may be varied.

The ratio resources shown in FIG. 1 include data channels serving as resources used when a terminal scheduled by wireless resource competition transmits data, and have hierarchical structures. One data region includes L data channels, and a plurality of frames Frame #0-Frame #9 is divided into first type frames (L=14) and second type frames (L=16). In FIG. 1, a first frame Frame #0 is represented as a first type frame, and second to tenth frames Frame #1-Frame #9 are represented as second type frames.

The first frame (Frame #0) as the first type frame includes a discovery region, a peering region, and a data region. The second frame Frame #1 as the second type frame includes a data region without a discovery region and a data region. Herein, each data channel of all the frames Frame #0-Frame #9 may have the same structure, and may further include additional resource for synchronization.

The superframe may be formed of at least one first type frame and a plurality of second type frames. In FIG. 1, the super frame is illustrated to include one first type frame Frame #0 and 9 second type frames Frame #1-Frame #9. A plurality of super frames constitutes one ultraframes. For example, in FIG. 1, one ultraframe is illustrated to include 16 superframes Superframe #0-Superframe #15).

Figure 2:
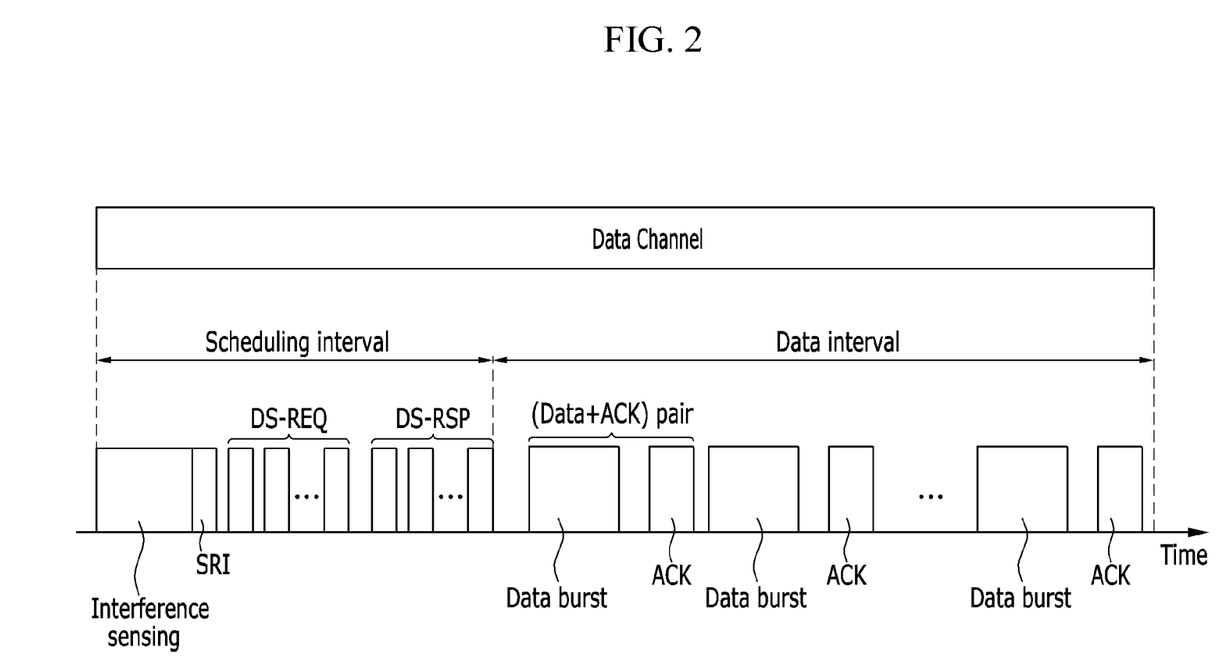
FIG. 2 shows a data channel structure according to an exemplary embodiment of the present invention.

FIG. 2 shows a data channel structure according to an exemplary embodiment of the present invention.

As shown in FIG. 2, according to an exemplary embodiment of the present invention, the data channel roughly includes a scheduling interval and a data interval.

The scheduling interval includes an interference sensing interval, a scheduling request indicator (SRI) interval, a distributed scheduling-request (DS-REQ) interval, and a distributed scheduling-response (DS-RSP) interval. The interference sensing interval serves to check whether there is an interference transmitted from a heterogeneous device, and the SRI interval is an interval used for transmitting a consecutive allocation signal. The DS-REQ interval has resources for transmitting DS-REQ as a request massage related to resources for distribution competition, and the DS-RSP interval has resources for transmitting DS-RSP as a response massage for the DS-REQ message.

The data interval is an interval in which distribution-scheduled terminals transmits and receives actual data to and from each other through exchange of DS-REQ and DS-REQ. As shown in FIG. 2, the data interval includes a plurality of pairs (Data burst+ACK). The data burst is used for a terminal to transmit data of a user or a management message. The ACK is used for reporting whether an error is generated in the receipt of MAC protocol data units (MPDU) in data or data bust received by terminals which receive the data burst, to the transmitting terminal.

A distributed access method according to an exemplary embodiment of the present invention is performed through a scheduling operation which secures a collision-free competition of shared resources. To that end, the transmitting terminal is required to be liked with a communication-target receiving terminal. In accordance with the distributed access method according to the present exemplary embodiment, a peering step for setting a link between the transmitting terminal and the communication-target receiving terminal is executed. In this case, a peering ID (PID) is set at operating regions of the transmitting terminal and the receiving terminal as an identifier for distinctly identifying the link set between the transmitting terminal and the receiving terminal. Herein, setting the PID indicates a distinct identifier that is orthogonal to other links being allocated to the transmitting terminal and the receiving terminal. Since a resource that is used for the peering, a peering method, and the PID setting is easily recognized to a person of ordinary skill in the art to which the present invention pertains, a detailed description thereof will be omitted. A plurality of PIDs that are orthogonal to each other is provided. In the present exemplary embodiment, it is assumed that 128 PIDs are provided for the convenience of description.

When the PID is allocated to the receiving terminal that has performed the peering step, data channel mapping is performed. Herein, the data channel mapping indicates the transmitting terminal and the receiving terminal that are peered with each other recognizing available resources (i.e., data channel capable of competition for data transmission) among the wireless radio resources shown in FIG. 1.

One frame includes L data channel. As shown in FIG. 1, 14 or 16 data channel may be provided in one frame (i.e., L=14 or 16). As shown in FIG. 2, a plurality of DS-REQ resources and DS-RSP resources are included in one data channel. In the present exemplary embodiment, it is assumed that one data channel includes 8 DS-REQ resources and 8 DS-RSP resources for the convenience of description. Accordingly, in the case of the second type frames Frame #1-Frame #9, 128 PIDs may be allocated to one frame. In other words, each of PIDs performs the data channel mapping one time in one frame. However, since the first frame Frame #0 has 14 data channels. 112 PIDs performs the data channel mapping. Referring to FIG. 1, no mapped data channel is provided every 10 frames. In the present exemplary embodiment, the mapping between the PID and the data channel is performed by using Equation 1.

$$I=\{floor(p/8)+s*10+n\} \bmod 16 \quad \text{(Equation 1)}$$

"I" indicates an index of a data channel to which a terminal having a PID of "p" is mapped, and ranges from 0 to 15. s(0-15) indicates an index of a superframe, and n(0-9) indicates an index of a frame.

In the meantime, according to the present exemplary embodiment, scheduling is performed based on an instantaneous priority of a terminal that participates in competition, and the priority is referred to as a scheduling priority (SP) hereinafter.

The SP is also used when a peered terminal (i.e., terminal having a PID) determines the DS-REQ and DS-RSP resources allocated to the terminal itself, in addition to the priority in the scheduling. In the case that a peered terminal recognizes its own data channel through the data channel mapping, a peered terminal searches DS-REQ and RSP resources allocated to the terminal itself among DS-REQ and DS-RSP resources shown in FIG. 2. The DS-REQ resource and the DS-RSP resource that are allocated to the peered terminal are determined by the SP as shown in FIG. 3.

Figure 3:
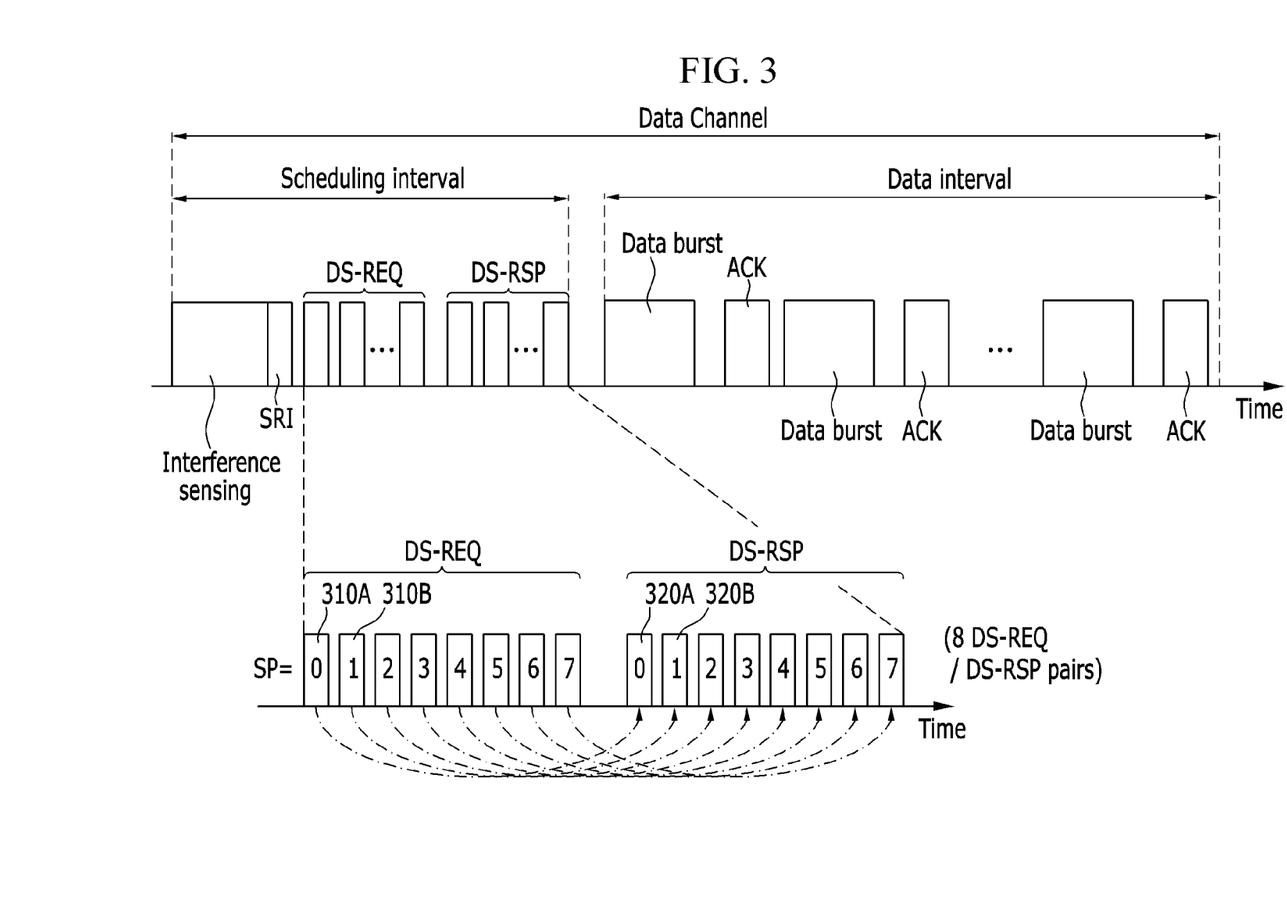
FIG. 3 shows a method of allocating a DS-REQ resource and a DS-REQ resource according to an exemplary embodiment of the present invention.

FIG. 3 shows a method of allocating a DS-REQ resource and a DS-REQ resource according to an exemplary embodiment of the present invention.

As shown in FIG. 3, the DS-REQ resource and the DS-REQ resource are sequentially allocated to terminals according to priority. Specifically, first DS-REQ 310A and DS-RSP 320A are allocated to a transmitting terminal and a receiving terminal which have a lowest priority (SP=0), and then second DS-REQ 310B and DS-RSP 320B are allocated to a transmitting terminal and a receiving terminal which have a next lowest priority (SP=1).

In the case that a terminal recognizes a data channel that is allocated to the terminal itself through the data channel mapping, the terminal is required to recognize a DS-REQ resource and a DS-RSP resource that are mapped to its own PID. The terminal may recognize the DS-REQ resource and the DS-RSP resource by using its own PID. In this case, the recognition is performed by SP mapping. In the following description, an operation in which a terminal recognizes a SP from the data channel that is allocated to the terminal itself by using its own PID is referred to as 'SP mapping.'

The number of the SP is the same as that of the DS-REQ resource or the DS-RSP resource. For the convenience of description, the SP ranges from 0 to 7, and the SP is defined to have a higher priority as a value of the SP is greater.

In a frame that has an index of a superframe ranging from 0 to 15 and an index of a frame ranging from 0 to 9, a SP(0-7) that is mapped to the terminal having the PID of p is determined by Equations 2 and 3.

When a value of (p+s*10+n) modulo 8 is not zero, the SP is determined by Equation 2.

$$SP(s, n, p) = \sum_{k=1}^{(p+s \times 10+n) \bmod ulo\ 8} (-1)^{k+1} \cdot (8-k) \quad \text{(Equation 2)}$$

When the value of (p+s*10+n) modulo 8 is zero, the SP is determined by Equation 3. In other words, when the value of (p+s*10+n) modulo 8 is zero, the highest priority (SP=0) is determined.

$$SP(s,n,p)=0 \quad \text{(Equation 3)}$$

The channel mapping and the SP mapping that are described above are performed, the terminal can recognize a data channel that can be used by the terminal itself at each frame and positions of the DS-REQ and DS-RSP resources from the data channel.

To transmit data, the transmitting terminal firstly checks whether there is an interference transmitted from a heterogeneous device at the interference sensing interval. The transmitting terminal, when determining there is the interference, gives up the competition in the data channel. At the interference sensing interval, the checking of the interference of the transmitting terminal is performed when the radio resource has an unlicensed band. When the radio resource has a licensed band, the checking may be omitted, or no interference sensing interval may exist.

Figure 4:
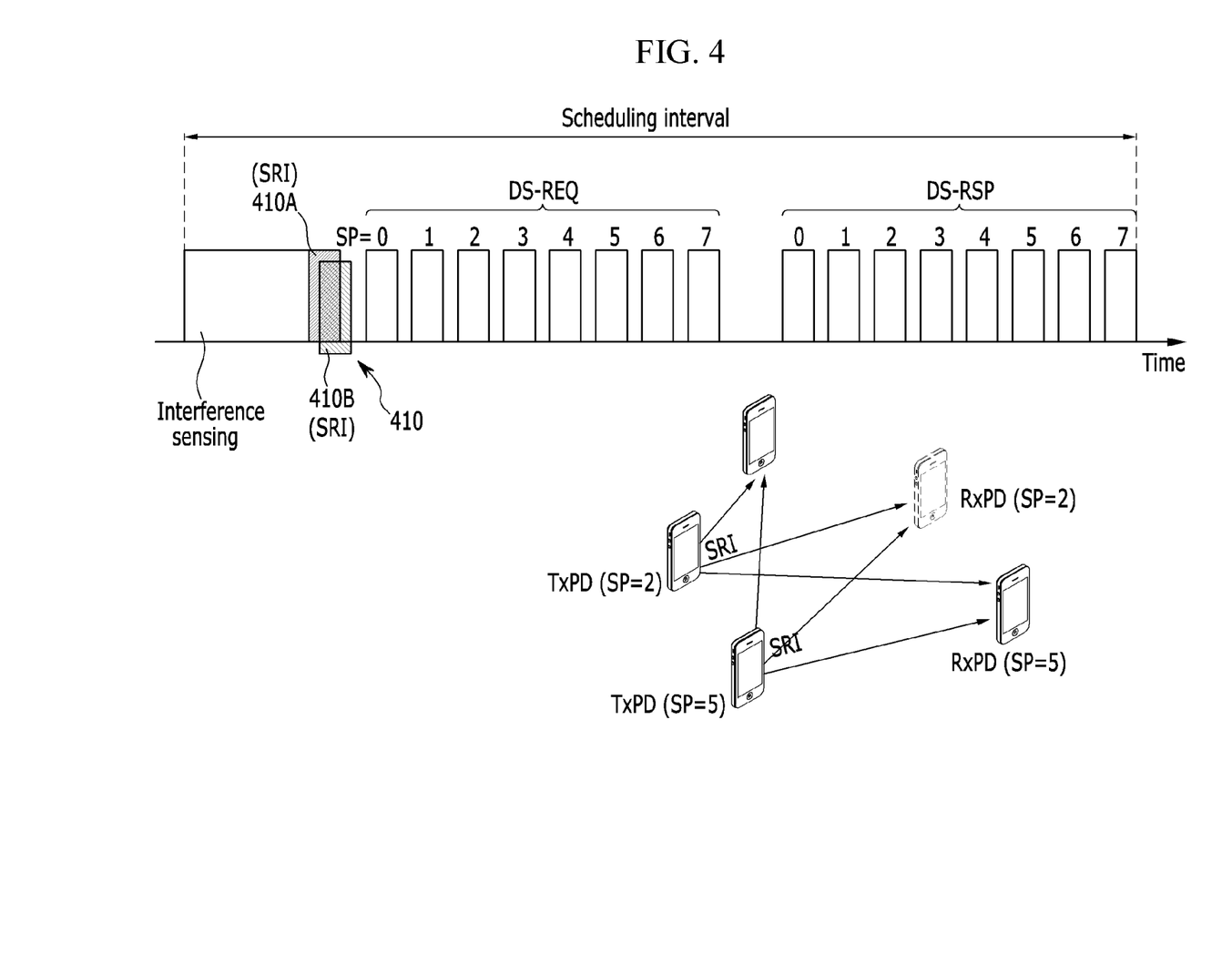
FIG. 4 shows how a SRI signal is transmitted by a transmitting terminal according to an exemplary embodiment of the present invention.

FIG. 4 shows how a SRI signal is transmitted by a transmitting terminal according to an exemplary embodiment of the present invention.

When it is determined that no interference exists at the interference sensing interval, the transmitting terminal broadcasts a scheduling request indicator (SRI) signal at a SRI interval 410, and then transmits the DS-REQ. As shown in FIG. 4, each of a transmitting terminal TxPD (SP=2) and a transmitting terminal TxPD (SP=5) broadcasts the SRI signal. The transmitting terminal TxPD (SP=2) broadcasts the SRI signal at a SRI interval 410A, and the transmitting terminal TxPD (SP=5) broadcasts the SRI signal at a SRI interval 410B. As a result, all transmitting terminals which are desired to transmit the DS-REQ signal broadcast the SRI signal.

The SRI signal is used for consecutive allocation, which will be described in detail.

Figure 5:
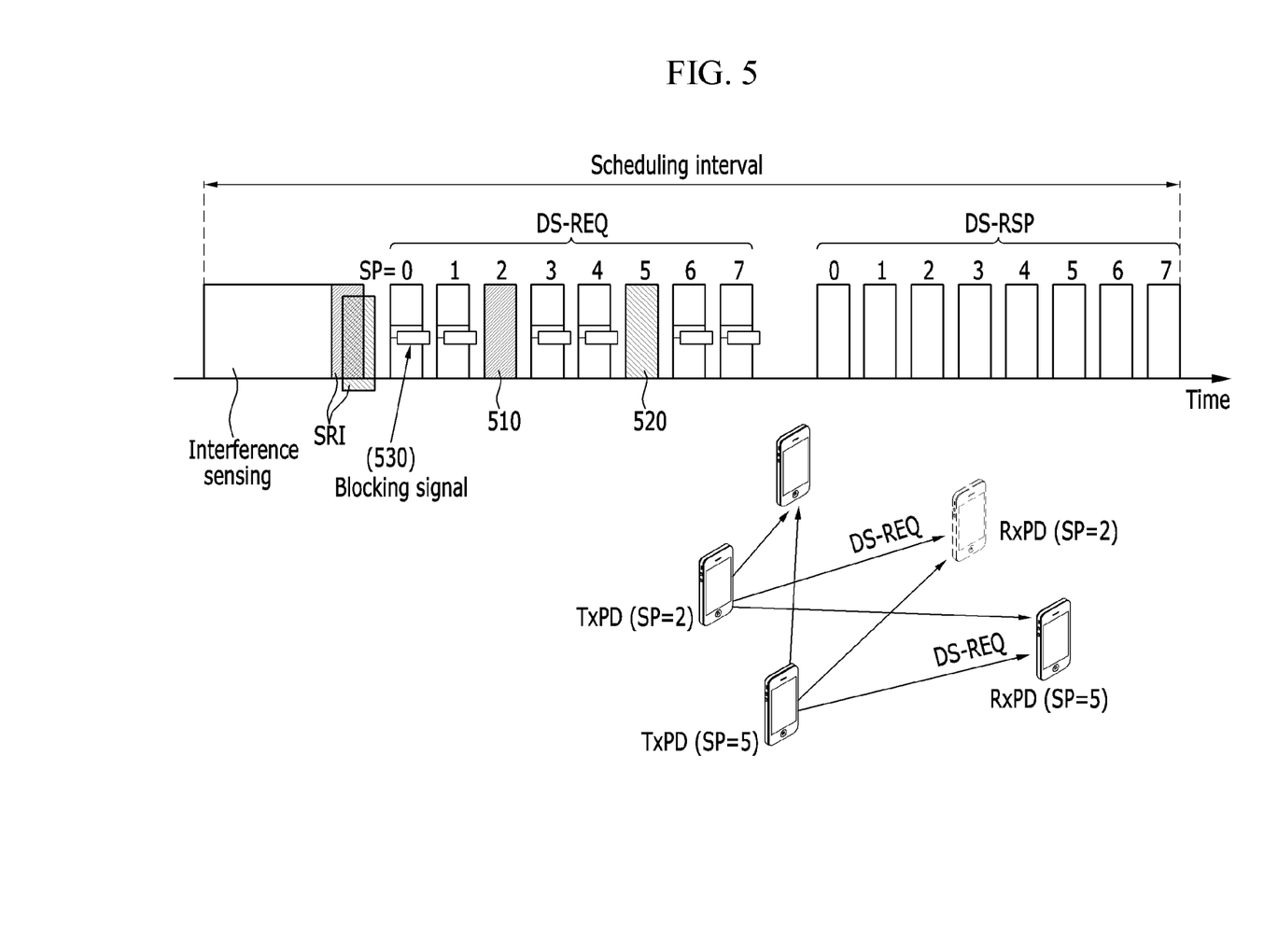
FIG. 5 shows how a DS-REQ signal and a blocking signal are transmitted by a transmitting terminal according to an exemplary embodiment of the present invention.

FIG. 5 shows how a DS-REQ signal and a blocking signal are transmitted by a transmitting terminal according to an exemplary embodiment of the present invention.

After transmitting the SRI signals, the transmitting terminals which take part in the competition to transmit data transmit the DS-REQ signal by using the DS-REQ resource corresponding to their own SP. As shown in FIG. 5, the transmitting terminal TxPD (SP=2) transmits the DS-REQ signal by using a DS-REQ resource 510 that is allocated to the terminal itself, and, the transmitting terminal TxPD (SP=5) transmits the DS-REQ signal by using a DS-REQ resource 520 that is allocated to the terminal itself.

The transmitting terminal may transmit its own DS-REQ, but is not required to receive another DS-REQ. In FIG. 5, a blocking 530 is a signal that is used at an unlicensed band. Specifically, the blocking signal 530 serves to prevent transmission of the signal caused in the case that a heterogeneous device erroneously determines an interval at which no DS-REQ signal is transmitted as an interval at which no ratio resource is used, in the unlicensed band. As shown in FIG. 5, all the transmitting terminals which transmit DS-REQ transmit the blocking signal 530 at the DS-REQ interval other than the interval at which their own DS-REQ is transmitted. In the meantime, when the ratio resource is used as a licensed band resource, the blocking signal 530 may be omitted.

When transmitting the DS-REQ, the transmitting terminal includes an amount of resource that is necessary for the terminal itself in the DS-REQ message at the data interval. Herein, the necessary amount of resource is determined in consideration of data burst that is necessary for data transmission of the transmitting terminal, ACK that is transmitted as a response of the data burst by the receiving terminal, and a gap corresponding to a transition time between the data burst and the ACK.

Figure 6:
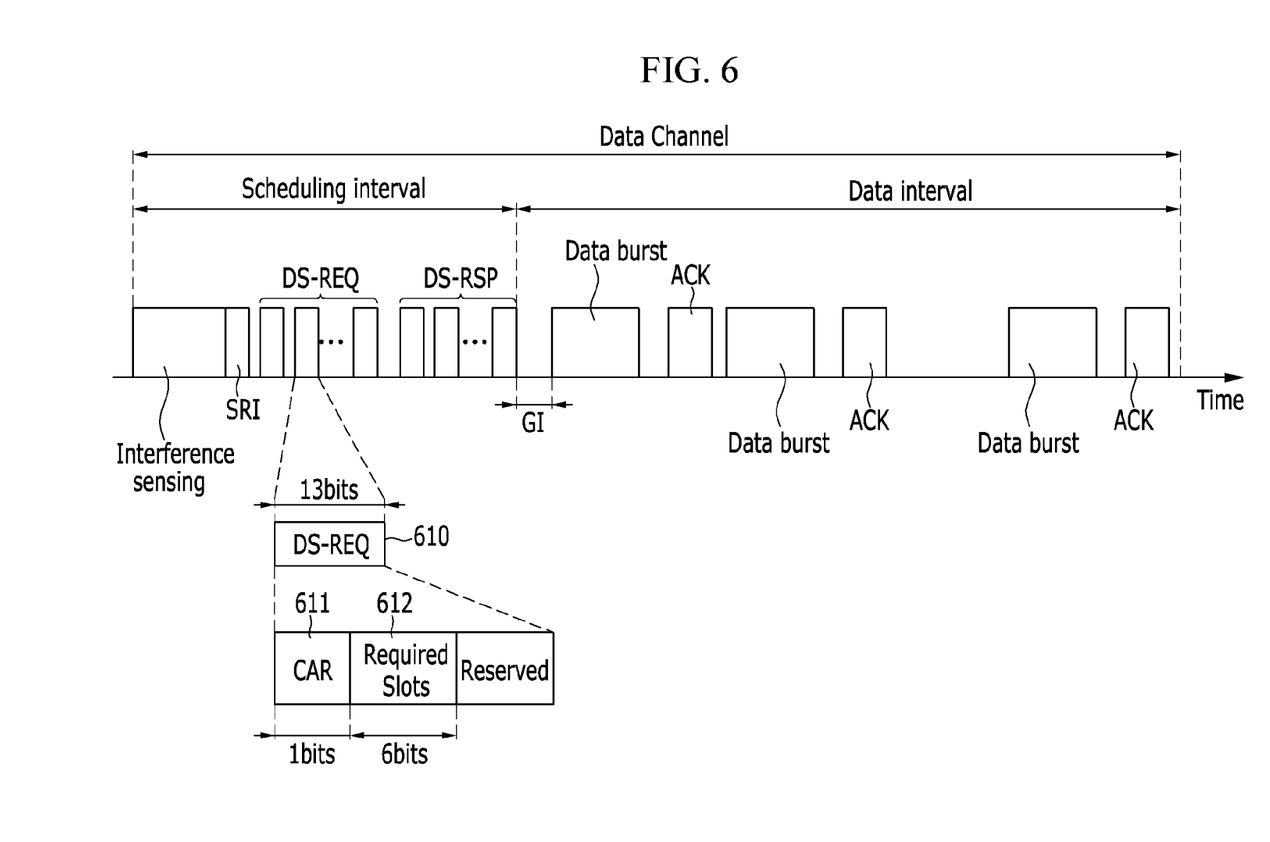
FIG. 6 shows a configuration of a DS-REQ signal according to an exemplary embodiment of the present invention.

FIG. 6 shows a configuration of a DS-REQ signal according to an exemplary embodiment of the present invention.

As shown in FIG. 6, a DS-REQ signal 610 includes a consecutive allocation request (CAR) field 611, and a requested slots field 612.

The CAR field 611 serves as a bit that is used in the consecutive allocation. This will be described in detail below.

The requested slots field 612 serves as a field for indicating an amount of resource that is necessary for the transmitting terminal at the data interval by the terminal itself. FIG. 6 shows the case that 240 OFDM symbols are used at the data interval. When 4 OFDM symbols are defined as one OFDM slot, the requested slots field 612 may use 6 bits to indicate the data interval with 60 OFDM slots. It is obvious that a length of an OFDM symbol unit of the data interval and the number of bits allocated to each of the DS-REQ signal fields are merely an example, and may be varied.

In the meantime, since the receiving terminal having the same PID as that of the transmitting terminal has the same SP as that of the transmitting terminal, the receiving terminal recognizes a position of a DS-REQ transmitted by the counterpart (i.e., transmitting terminal). When receiving the DS-REQ of the peered counterpart (i.e., transmitting terminal) at the recognized position of the DS-REQ, the peered receiving terminal receives all DS-REQs corresponding to SPs that are higher than its own SP after receiving the DS-REQ Accordingly, it is possible to calculate an offset that is transmitted by the receiving terminal in response to the DS-REQ of the transmitting terminal. The receiving terminal includes the offset in an offset field to transmit the DS-RSP.

Figure 7:
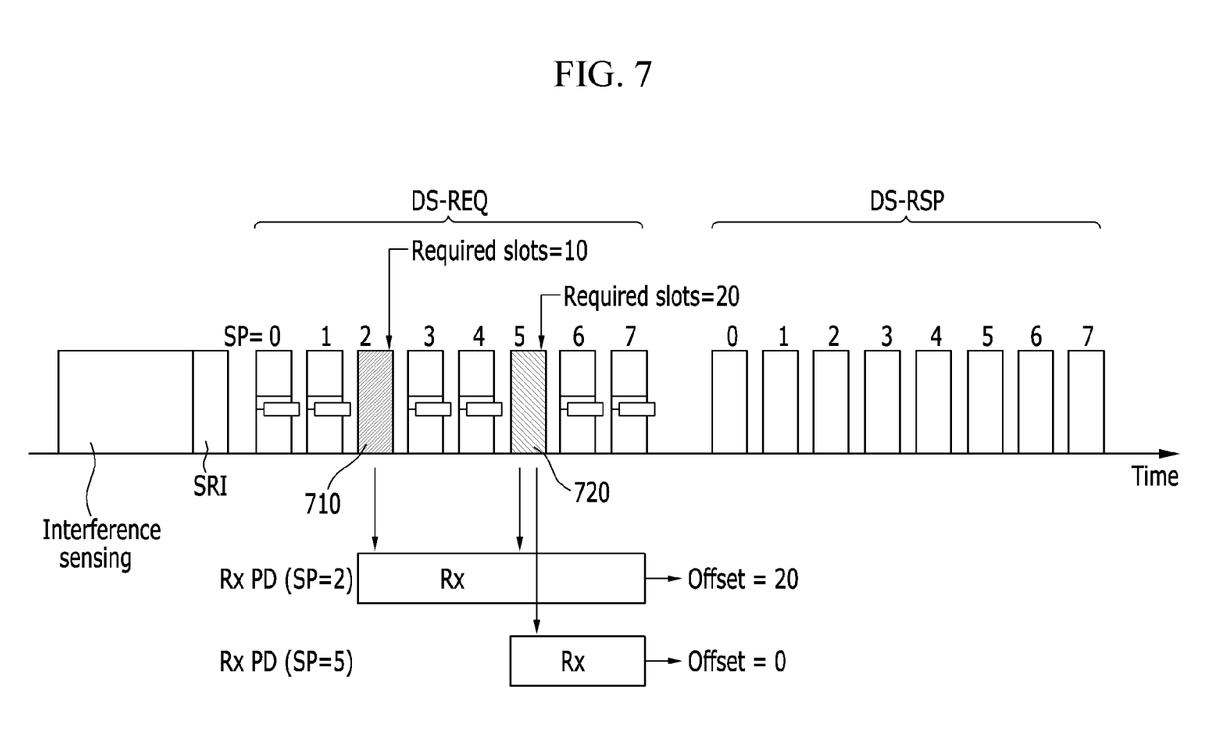
FIG. 7 shows how an offset is calculated by a receiving terminal according to an exemplary embodiment of the present invention.

FIG. 7 shows how an offset is calculated by a receiving terminal according to an exemplary embodiment of the present invention.

The receiving terminal RxPD (SP=2) receives a DS-REQ of the transmitting terminal TxPD (SP=2) from a DS-REQ 710. The receiving terminal RxPD (SP=2) receives a DS-REQ 720 having a SP that is higher than that of the terminal itself, and calculates an offset by accumulating a requested slots field value included in the DS-REQ 720. As shown in FIG. 7, the receiving terminal RxPD (SP=2) calculates the offset as 20, and the receiving terminal RxPD (SP=5) calculates as 0 since no DS-REQ having a SP that is higher than that of the terminal itself.

As such, the receiving terminal calculate the offset by accumulating all requested slots field values of the DS-REQs having SPs that are higher than its own SP.

Figure 8:
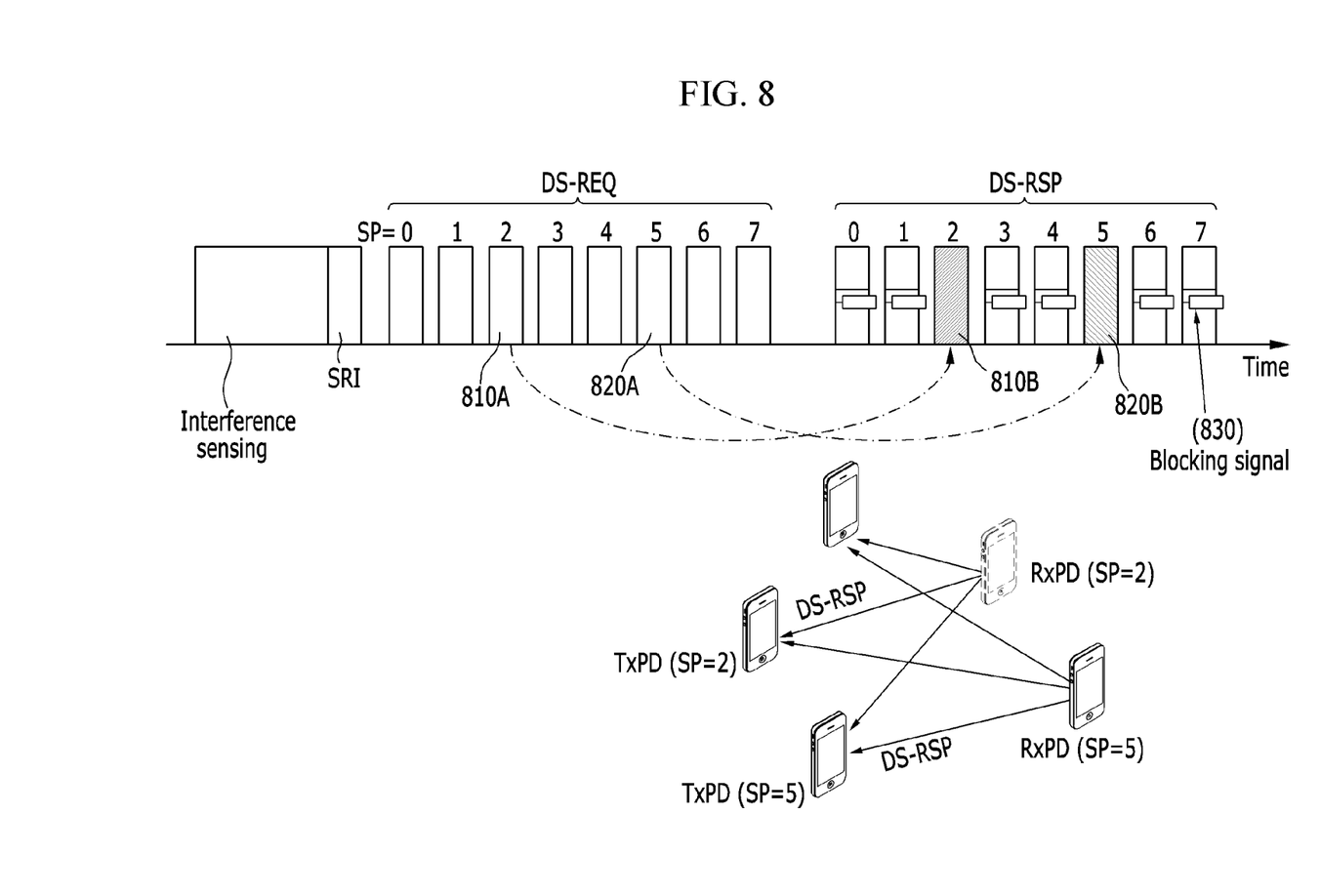
FIG. 8 shows how DS-RSP is transmitted by a receiving terminal according to an exemplary embodiment of the present invention.

FIG. 8 shows how DS-RSP is transmitted by a receiving terminal according to an exemplary embodiment of the present invention.

The receiving terminal receiving a DS-REQ transmits a DS-RSP to the transmitting terminal by using a DS-RSP resource that is mapped through the SP shared with the transmitting terminal. As shown in FIG. 8, the receiving terminal RxPD (SP=2) receives a DS-REQ 810A from the transmitting terminal TxPD (SP=2) and transmits a DS-RSP 810B to the transmitting terminal TxPD (SP=2). The receiving terminal RxPD (SP=5) receives a DS-REQ 820A from the transmitting terminal TxPD (SP=5) and transmits a DS-RSP 820B to the transmitting terminal TxPD (SP=5).

The receiving terminal may transmit its own DS-RSP, but is not required to receive another DS-RSP. In FIG. 8, the blocking signal 830 is a signal that is used at an unlicensed signal. Specifically, the blocking signal 830 serves to prevent transmission of the signal caused in the case that a heterogeneous device erroneously determines an interval at which no DS-RSP signal is transmitted as an interval at which no ratio resource is used, in the unlicensed band As shown in FIG. 8, all the transmitting terminals which transmit DS-RSP transmit the blocking signal 830 at the DS-RSP interval other than the interval at which their own DS-RSP is transmitted In the meantime, when the ratio resource is used as a licensed band resource, the blocking signal 830 may be omitted.

When transmitting the DS-RSP, the receiving terminal includes the offset described in FIG. 7 therein. Then, the receiving terminal includes a requested slots field value included in the received DS-REQ in an allocated slots field of the DS-RSP as it is. In this case, when (offset+'required slot') is greater than the data interval, the receiving terminal subtracts the greater portion of (offset+'required slot') than the data interval from the requested slots field value included in the DS-REQ and set the result value (i.e., a portion of the data interval) as the allocated slots field value to transmit the DS-RSP.

The transmitting terminal which transmits the DS-REQ recognizes a position of the DS-RSP transmitted by the receiving terminal through the SP mapping. In this case, when receiving the DS-RSP transmitted by the peered counterpart (i.e., receiving terminal) at the recognized position of the DS-RSP, the transmitting terminal receives all DS-RSPs having SPs that are higher than its own SP thereafter. Accordingly, when transmitting data burst and receiving ACK at the data interval, the transmitting terminal can prevent collision with ACK and data burst from a transmitting terminal and a receiving terminal having a SP that is higher than its own SP The transmitting terminal checks whether resources allocated to another terminal having a higher SP is overlapped with resources allocated to the terminal itself by using allocated slots fields and offsets included in a DS-RSP having a higher SP. When it is determined that some or all of the resources are overlapped, the transmitting terminal gives up data burst transmission. Herein, the overlapping may be generated in the case of a hidden node problem or in the case that all terminals that participate in the competition do not receive all the DS-REQs or the DS-RSPs of other terminals having higher SPs. When the overlapping is not generated, the transmitting terminal uses a portion of the resource corresponding to a gap caused by 'allocated slots'– (length of ACK+a transition time between data burst and ACK) for transmission of its own data burst, from a position of offset included in the DS-RSP transmitted by the peered receiving terminal.

As described with reference to FIG. 2, the receiving terminal that has received data bursts informs the transmitting terminal of whether all the data bursts is received, or whether each of a plurality of MAC protocol data units (MPDU) included in the data bursts is received by using ACK.

Hereinafter, consecutive allocation will be described with reference to FIG. 9. The consecutive allocation indicates a method of having an opportunity in which a terminal participating in competition for the mapped data channel #n participates in competition for a following data channel #(n+1) to which the terminal itself is mapped to obtain consecutive resource allocation when no terminal participates in the data channel #(n+1). According to the data channel mapping, a terminal that has participated in competition for data channel #n is not allowed to participate in competition for a data channel #(n+1). However, in the case of a condition of consecutive allocation, it is possible to participate in the competition.

A transmitting terminal that attempts consecutive allocation sets the CAR field 611 as a bit (e.g., 1) for requesting consecutive allocation to transmit it, the CAR field 611 being a field of a DS-REQ signal sent from the data channel #n mapped to the terminal itself. In the meantime, the method by which the terminal competes for data channel #n is the same as described above.

Next, when the transmitting terminal that sets the CAR field 611 as "1" in the data channel #n and transmits it normally receives a DS-RSP from a receiving terminal in the data channel #n, the transmitting terminal checks whether a SRI signal exists in a data channel #(n+1). The receiving terminal receiving the DS-REQ signal in which the CAR is set as 1 from the transmitting terminal checks whether the SRI signal exists in the data channel #(n+1).

When it is determined that the SRI signal exists in the data channel #(n+1), the transmitting terminal and the receiving terminal stop consecutive allocation. However, when it is determined that no SRI signal exists in the data channel #(n+1), the transmitting terminal and the receiving terminal continue having competition for the data channel #(n+1) by using the same SP as that of the data channel #n).

Terminals that are mapped to the follow-up data channel #(n+1) through the consecutive allocation can solve an under-utilization problem caused in the case of not using their data channel #(n+1).

Figure 9:
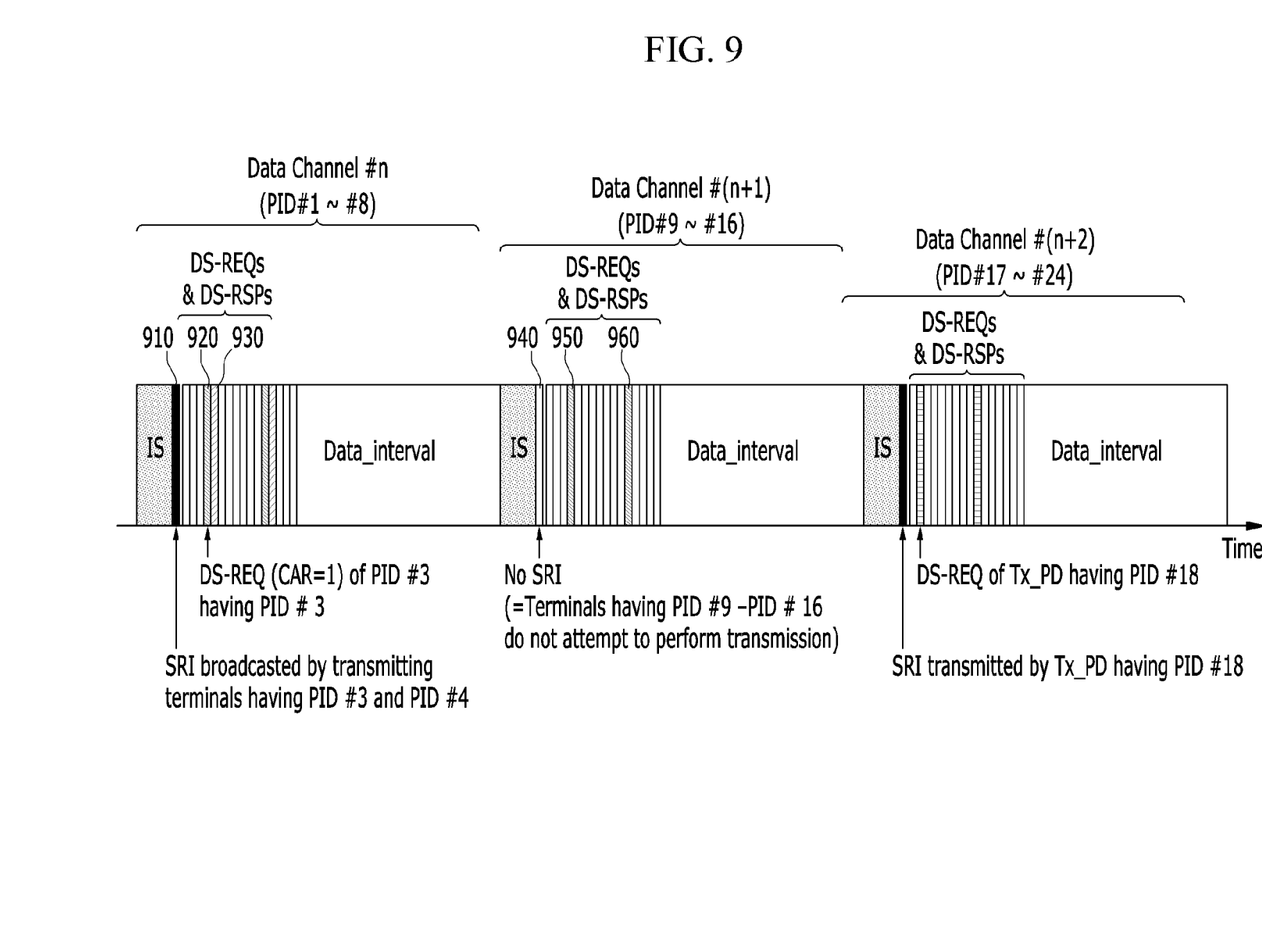
FIG. 9 shows a consecutive allocating method according to an exemplary embodiment of the present invention.

FIG. 9 shows a consecutive allocating method according to an exemplary embodiment of the present invention. In FIG. 9, PID #n indicates the number of PID. For example, FIG. 9 shows the case that a terminal having PID #3 performs the consecutive allocation.

When the terminals having PID #3 and PID #4 compete for the data channel #n with each other, each of the transmitting terminal Tx_PD having PID #3 and the transmitting terminal Tx_PD having PID #4 transmits the SRI signal at an SRI interval 910.

Then, in the data channel #n, the transmitting terminal Tx_PD having PID #3 sets a CAR field of its own DS-REQ 920 as 1 to attempt the consecutive allocation in the data channel #(n+1). In FIG. 9, a reference numeral "930" indicates a DS-REQ of the transmitting terminal having PID #4.

Each of the transmitting terminal and the receiving terminal that are peered to each other with PID #3 checks whether the SRI signal exists in the data channel #(n+1). As shown in FIG. 9, since the terminals having PID #9-PID #16 do not attempt to perform transmission, no SRI signal exists at the SRI interval of the data channel #(n+1). That is, the terminals having PID #9-PID #16 have no competition.

In this case, each of the transmitting terminal and the receiving terminal that are peered to each other with PID #3 checks the SRI interval 940 and determines that no SRI signal exists, and has competition for the data channel #(n+1) while maintaining the SP of the previous data channel #n. As a result, as shown in FIG. 9, the transmitting terminal having PID #3 transmits a DS-REQ 950 to participate in competition, and the receiving terminal having PID #3 transmits a DS-RSP 960 to participate in competition.

In the meantime, in addition to the terminal having PID #3, other terminals PID #1, PID #2, and PID #4-PID #8 may have competition for the data channel #(n+1). In even this case, since the terminals having PID #1, PID #2, and PID #4-PID #8 have competition for the data channel #(n+1) while maintaining the SP of the previous data channel #n, their DS-REQs are not subjected to collision.

Referring to FIG. 9, in the case of a data channel #(n+2), a terminal having PID #18 that is mapped to the data channel #(n+2) participates in competition. In this case, although re-attempting the consecutive allocation for the data channel #(n+2), the terminal having PID #3 is not able to participate in the competition for the data channel #(n+2). This is because, in the case of the data channel #(n+2), the terminal having PID #18 transmits the SRI signal before transmitting the DS-REQ.

Figure 10:
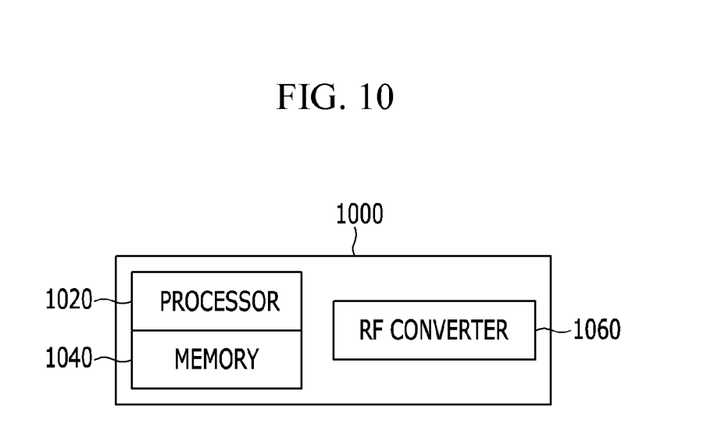
FIG. 10 shows a terminal 1000 according to an exemplary embodiment of the present invention.

FIG. 10 shows a terminal 1000 according to an exemplary embodiment of the present invention. The terminal 1000 according to the present exemplary embodiment may be the transmitting terminal or the receiving terminal that are described above.

As shown in FIG. 10, the terminal 1000 according to the present exemplary embodiment includes a processor 1020, a memory 1040, and a radio frequency (RF) converter 1060. The processor 1020 may be configured to realize processes and methods that are described with reference to FIG. 1 to FIG. 9. The memory 1040 is connected to the processor 1020 to store various information related to operations of the processor 1020. The RF converter 1060 is connected to the processor 1020 to transmit or receive a wireless signal. The terminal 1000 may have a single antenna or a multiple antenna.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for allowing a first terminal to perform a distributed access in a first frame including a plurality of data channels, the method comprising:
    establishing a peer-to-peer communication between the first terminal and a second terminal in a wireless network using a peering identifier unique to the first terminal and the second terminal;
    mapping, by the first terminal, a first data channel among the data channels to the first terminal;
    mapping, by the first terminal, a scheduling priority of the first terminal; and
    determining, by the first terminal, positions, in the first data channel, of resources of a first message as a resource request message and a second message as a response message for the first message according to the scheduling priority;
    receiving, by the second terminal, the first message from terminals having scheduling priorities that are higher than the scheduling priority of the first terminal;
    calculating, by the second terminal, an offset indicating a position of a scheduled resource by using the first message received from the terminals having the scheduling priorities that are higher than the scheduling priority of the first terminal; and
    transmitting, by the second terminal to the first terminal, the second message including the offset and an allocated slots field indicating an amount of resources that are allocated for the first terminal in response to a first message from the first terminal,
    wherein the first message includes a required slots field indicating an amount of resources that are necessary for the first terminal to perform data transmission over the first data channel; and
    performing, by the first terminal, data transmission at the determined position of the resources allocated for the first terminal indicated by the second message.

2. The method of claim 1, wherein the mapping of the first data channel comprises mapping the first data channel according to the peer identifier, an index of a superframe to which the first frame pertains, and an index of the first frame.

3. The method of claim 2, wherein the index "i" of the first data channel is determined by the following equation:

$I = \{\text{floor}(p/8) + s*10 + n\} \bmod 16$ where "p" indicates the distinct identifier of the first terminal, "s" indicates the index of the superframe, and "n" indicates the index of the first frame.

4. The method of claim 1, wherein the determining of the scheduling priority comprises determining the scheduling priority according to the distinct identifier (p) of the first terminal, the index (s) of the superframe to which the first frame pertains, and the index (n) of the first frame.

5. The method of claim 4, wherein the scheduling priority is differently determined according to whether a first value of (p+s*10+n) modulo 8 is zero.

6. The method of claim 5, wherein, when the first value is not zero, the scheduling priority of the first terminal is determined by the following equation:

$$SP(s, n, p) = \sum^{(p+s \times 10+n) \bmod 8} (-1)^{k+1} \cdot (8-k).$$

7. The method of claim 5, wherein, when the first value is zero, the scheduling priority is zero.

8. The method of claim 1, further comprising,
    when the first terminal attempts to transmit the first message, transmitting a first signal serving to indicate that the first frame is to be transmitted.

9. The method of claim 1, further comprising:
    transmitting the first message at the determined position of the resource of the first message; and
    transmitting a blocking signal at an interval for the first message other than the first message of the first terminal.

10. The method of claim 1, wherein
    a value of the required slots field is determined according to data burst that is necessary for data transmission of the first terminal, an ACK that are received from a second terminal peered to the first terminal, and a gap corresponding to a time difference between the data burst and the ACK.

11. The method of claim 1, further comprising receiving the second message at the determined position of the resource of the second message from the second terminal.

12. The method of claim 11, further comprising:
receiving the second message from third terminals having scheduling priorities that are higher than the scheduling priority of the first terminal after receiving the second message from the second terminal; and
checking whether resources allocated to the third terminals and a resource allocated to the first terminal are overlapped to each other by using the second message received from the third terminals.

13. The method of claim 1, further comprising:
determining whether remaining terminals other than the first terminal and the second terminal participate in competition for a second data channel as a data channel that follows up the first data channel; and
performing consecutive allocation in the second data channel when the remaining terminals do not participate in the competition.

14. A terminal comprising: a wireless frequency converter; and
a processor connected to the wireless frequency converter to map data channels to be allocated in a plurality of data channels included in a frame and map scheduling priorities for resources,
wherein the processor performs the mapping of the data channels and the mapping of the scheduling priorities according to the terminal distinct identifier, an index of a superframe to which the first frame pertains, and an index of the first frame,
wherein the wireless frequency converter is configured to receive a first message and a second message, and the processor is configured to determine a position, in the first channel, of resources of the first message as a resource request message and of the second message as a response message for the first message according to the scheduling priorities,
wherein the first message includes a required slots field indicating an amount of resources that are necessary for the terminal to perform data transmission over the first data channel,
wherein the second message includes an offset indicating position of a scheduled resource and an allocated slots field indicating an amount of resources that are allocated for the terminal,
wherein a second terminal, which is peered with the terminal receives the first message from terminals having scheduling priorities that are higher than the scheduling priority of the terminal, calculates the offset by using the first message received from the terminals having the scheduling priorities that are higher than the scheduling priority of the terminal, and transmits the second message including the offset and the allocated slots field to the terminal in response to a first message from the terminal, and
the terminal performs data transmission at the determined position of the resources allocated for the terminal indicated by the second message.

15. The terminal of claim 14, wherein the processor determines whether remaining terminals other than the terminal participate in competition in a data channel that follows up the mapped data channel and, when the remaining terminals do not participate in the competition, controls the terminal perform consecutive allocation.

16. The terminal of claim 14, wherein the processor differently maps the scheduling priorities according to whether a value of (distinct identifier of the terminal+index of the superframe*10+index of the frame) modulo 8 is zero.

* * * * *